Patented Dec. 25, 1945

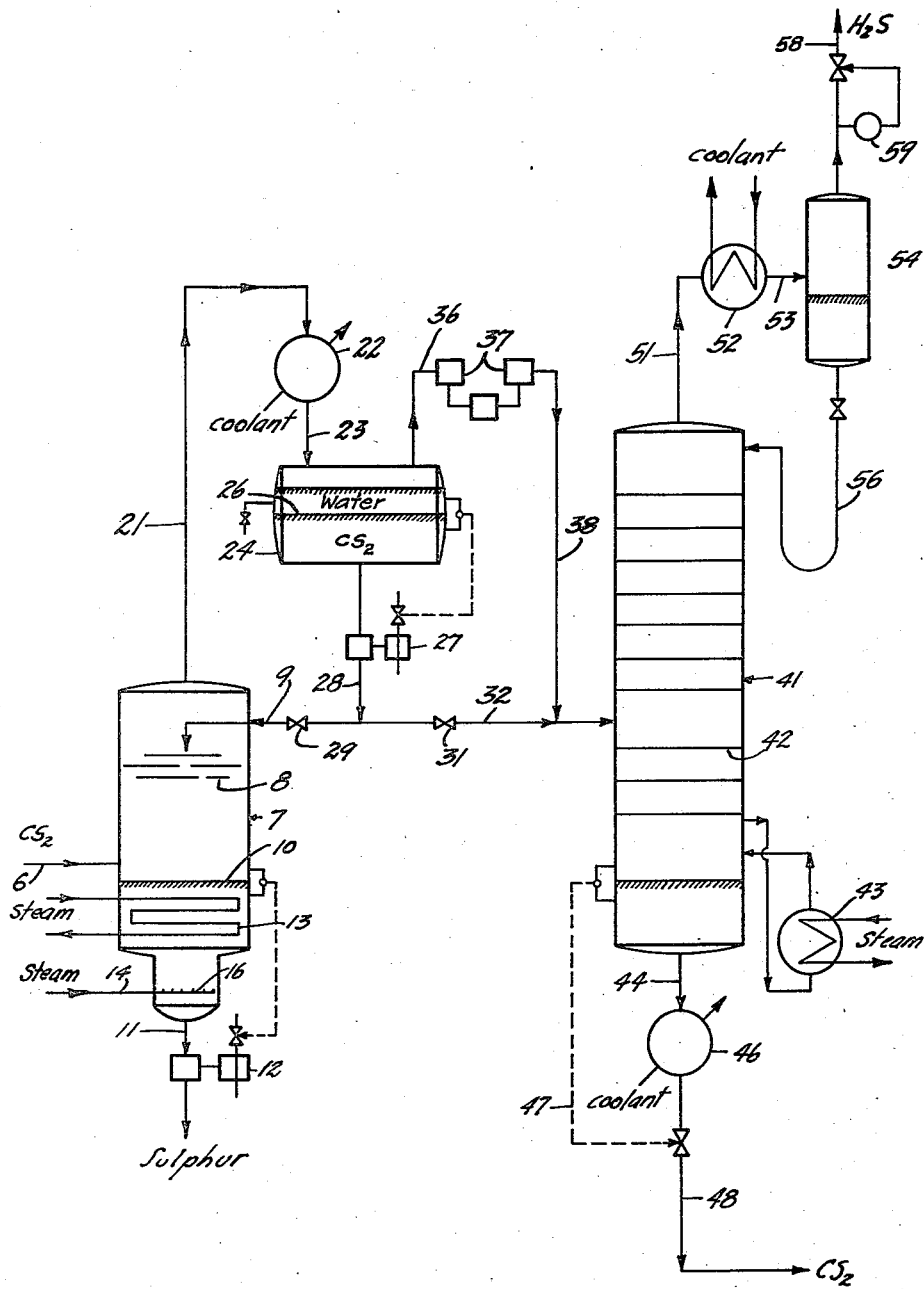

2,391,541

UNITED STATES PATENT OFFICE 2,391,541

PURIFYING CARBON DISULPHIDE

Arnold Belchetz, Larchmont, N. Y., assignor to Stauffer Chemical Company, a corporation of California Application December 11, 1943, Serial No. 513,891

6 Claims. (Cl. 202—40)

This invention relates to the purification by distillation of raw carbon disulphide containing small quantities of such impurities as hydrogen sulphide and sulphur and which are present in the carbon disulphide as a result of the manufacturing process employed.

The process of the present invention is particularly suited to the purification of carbon disulphide which is available in vapor form with hydrogen sulphide, sulphur and entrained solids. The usual practice is to condense this vapor to liquid form and then separate the undesirable materials present by distillation. By processing the raw carbon disulphide vapors, one can eliminate numerous operations required when one condenses the vapor to liquid; in addition, the apparatus required is simplified.

In general outline, the process of this invention includes feeding the raw carbon disulphide vapor to a still under the pressure at which it comes from the retort in which the $CS_2$ is manufactured. At the outset, therefore, the numerous difficulties of pumping a liquid carbon bisulphide feed to the still are obviated. In the still, the vapors are cooled to condense sulphur, hydrogen sulphide and carbon disulphide being evolved and separated as a sulphur-free vapor mixture. The sulphur and dirt which collect are periodically drawn off from the still free of carbon disulphide. The temperature of vaporized mixture of carbon disulphide and hydrogen sulphide leaving the still is controlled by refluxing condensed, but not necessarily purified, $CS_2$ to the still. The temperature of the vapor feed entering the still and the relative proportions of the $H_2S$, $CS_2$ and free sulphur in the feed will determine the quantity of $CS_2$ reflux which is required to desuperheat the vapors sufficiently for the sulphur to condense, but for the $CS_2$ and the $H_2S$ to remain vaporized. By first separating the sulphur from the disulphide, subsequent purification of the carbon disulphide is simplified for the chances of any significant quantity of sulphur carrying over with the hydrogen sulphide-carbon disulphide vapors are minimized by utilizing sufficient $CS_2$ reflux to reduce the temperature of the vapors to a level at which sulphur has a very low vapor pressure. The $CS_2$ reflux also causes any dirt to remain in the sulphur in the still and prevents it from escaping into the subsequent rectifying column. The overhead vapor stream is cooled and condensed to provide a liquid for reflux to the desuperheating tower and for feeding to a rectification column for elimination of the $H_2S$. Since this rectification can be done with exactness, rectification of the carbon disulphide and elimination of hydrogen sulphide can be carried on in small, compact equipment designed for operation in a narrow range of conditions.

Further advantages will become apparent upon considering the following more detailed disclosure in conjunction with the single figure in the drawing which forms a part of this specification and which is a flow sheet and a diagrammatic representation of suitable epuipment. Those skilled in chemical engineering can readily provide suitable equipment to handle any given set of conditions.

Referring to the drawing, a raw carbon disulphide vapor is introduced through line 6 into a vessel 7 wherein the carbon disulphide and hydrogen sulphide are separated from sulphur by lowering the vapor temperature to condense and drop out sulphur, leaving the $CS_2$ and $H_2S$ in vapor form. Vessel 7 includes several baffle plates 8 over which flows sufficient liquid carbon disulphide, introduced through line 9, to cause sulphur ot condense and collect in the bottom of the vessel. Liquid sulphur and any other condensed material is removed through line 11 under the control of a flow regulating device indicated generally at 12, the liquid level being maintained at about line 10. The sulphur is maintained in a liquid condition with heat supplied by steam coil 13. The baffles 8 provide contact between the vapors and reflux for removing any mechanically entrained solids from the reaction vapors. Sufficient reflux of carbon disulphide is maintained to secure a good separation of carbon disulphide and sulphur and to wash any entrained solids down into the sulphur.

To ensure that all residual carbon disulphide is removed from the liquid sulphur, a line 14 is provided in the base of vessel 7 having a plurality of jets 16. Through this line 14 a small quantity of stripping gas, such as steam, is introduced into the liquid sulphur to strip out of the sulphur any entrained carbon disulphide. In place of steam one can employ any suitable gas which is nonreactive with the sulphur and which is compatible with the separation of the carbon disulphide from the other components, such as nitrogen or hydrogen sulphide. The volatile gases containing $H_2S$ which leave the apparatus through line 58 can conveniently be recycled for this purpose.

Carbon disulphide and steam from line 16 pass upwardly from vessel 7 as vapors through line 21 into a condenser 22 and then on through line 23 into a reflux drum 24 wherein they condense and stratify. Vapor passage through line 21 can be coordinated with the heat supplied vessel 7 through steam lines 13 and 14. The $CS_2$ vapor stream enters the vessel 7 at whatever pressure is available from the retort in which the $CS_2$ is manufactured. The actual pressure in the vessel 7 is set by the pressure drop through the condenser 22 and the suction pressure maintained in the reflux drum 24 by the compressor 37. It is thus possible to operate the vessel 7 under vacuum if one so desired.

A body of carbon disulphide is maintained up to about line 26 in drum 24 by a flow device generally indicated at 27, this device controlling release of liquid carbon disulphide from the drum through line 28. Valves 29 and 31 regulate the quantity of carbon disulphide admitted into line 9 and line 32. Water is drawn off as is required.

I would emphasize the function of the vessel 7 as a desuperheater. This vessel 7 is essentially a desuperheater in which the hot vapors leaving a $CS_2$ retort are cooled as a $CS_2$ liquid reflux to a point where the sulphur condenses but at which the $CS_2$ and $H_2S$ will remain as vapor. In doing this the $CS_2$ will also wash out any entrained solids from the reaction vapors and these will accumulate in the molten sulphur. The function of the reboiler (provided by heat supplied through lines 13 and 14) is to maintain the sulphur in a molten condition and to boil out as much of the $CS_2$ which is dissolved in the molten sulphur as possible. It is not possible to obtain complete separation of carbon disulphide from sulphur by simple heating. For complete separation of $CS_2$ from the molten sulphur it is necessary to use a stripping gas such as steam, nitrogen, or even $H_2S$. This stripping of the molten sulphur is a refinement which need only be considered in actual operation if it is necessary to obtain an absolutely $CS_2$-free sulphur. For most purposes this may not be necessary.

The gaseous atmosphere collecting in vessel 24 is removed through vapor line 36 into compressor 37 and thence through line 38 into line 32 to discharge with the carbon disulphide stream into the hydrogen sulphide stripper 41. This comprises a fractionating tower with trays 42. A steamheated reboiler 43 is connected to the bottom of the tower to supply heat sufficient to expel any hydrogen sulphide from the carbon disulphide which collects in the bottom of the tower. Carbon disulphide, free of hydrogen sulphide, is removed through line 44, through condenser 46, and released, under the control of level control device 47 through line 48 as a bottom product.

The vapors from the top of the hydrogen sulphide stripper are removed through line 51 into a condenser 52 and thence through a line 53 into a gas separator 54. The pressure in the stripper 41 and the temperature to which the vapors from the stripper are cooled in the condenser 52 are so regulated that substantial separation of carbon disulphide as a liquid occurs in the gas separator 54. Condensed liquid in the gas separator is returned through line 56 as a reflux into the top of the stripper. Uncondensed gas, comprising hydrogen sulphide, is released through line 58 under the control of pressure regulating device 59.

As I mentioned previously, the steam which we have shown as being used for stripping can be replaced by a recycle of uncondensed gas leaving the $CS_2$ rectification column. In most cases one would prefer to use steam, as not only does it introduce some heat into the system but it condenses and thus does not add to the load of the compressor which operates on the uncondensed gases. If one recycled the uncondensed gases the load on this compressor would naturally be increased. However, since the stripping of the $CS_2$ from the molten sulphur is readily accomplished, this increase in compressor load may not be significant and it may be deemed preferable to use recycle gas in place of steam to avoid a corrosion problem resulting from the introduction of water into the system.

From the foregoing it will be seen that in the vessel 7, sulphur and carbon disulphide are separated in a very simple and expeditious manner, and in the stripper 41 the carbon disulphide free of sulphur is separated from any fixed gases present, such as hydrogen sulphide. When carbon disulphide is fed to vessel 7, the reflux acts to remove heat from the vapor feed and condense the sulphur to a liquid. When liquid carbon disulphide is fed sufficient heat must be supplied to vessel 7 to vaporize all the carbon disulphide and leave the liquid sulphur behind.

I claim:

1. A process for separating and recovering substantially pure carbon disulphide from the vapor stream evolved from a carbon disulphide retort and including hydrogen sulphide and sulphur, said process including utilization of a first and a second rectifying column, the process comprising introducing said vapor stream as such and without any substantial prior cooling into the first column, scrubbing said vapor stream in said first column with crude liquid carbon disulphide to cool said vapor stream to an extent only sufficient substantially to condense sulphur which collects as a liquid in the bottom of the first column, removing a gas stream from the top of the first column, cooling said stream to condense carbon disulphide and provide (1) an uncondensed gas fraction and (2) crude liquid carbon disulphide, returning a portion of said liquid carbon disulphide to the first column to scrub said vapor stream as aforesaid, introducing the balance of the crude liquid carbon disulphide and said gas fraction into the second column to separate carbon disulphide from hydrogen sulphide and other uncondensable gases, and recovering the carbon disulphide from the second column as a substantially pure product.

2. A process for separating and recovering substantially pure carbon disulphide from the vapor stream evolved from a carbon disulphide retort and including hydrogen sulphide and sulphur, said process including utilization of a first and a second rectifying column, the process comprising introducing said vapor stream as such into the first column, scrubbing said vapor stream in said first column with crude liquid carbon disulphide to cool said vapor stream to an extent only sufficient substantially to condense sulphur which collects as a liquid in the bottom of the first column, heating the collected liquid sulphur to vaporize any carbon disulphide entrained therein, removing a gas stream from the top of the first column, cooling said stream to condense carbon disulphide and provide (1) an uncondensed gas fraction and (2) crude liquid carbon disulphide, returning a portion of said liquid carbon disulphide to the first column to scrub said vapor stream as aforesaid, introducing the balance of the crude liquid carbon disulphide and said gas fraction into the second column to separate carbon disulphide from hydrogen sulphide and other uncondensable gases, and recovering the carbon disulphide from the second column as a substantially pure product.

3. A process for separating and recovering substantially pure carbon disulphide from the vapor stream evolved from a carbon disulphide retort and including hydrogen sulphide and sulphur, said process including utilization of a first and a second rectifying column, the process comprising introducing said vapor stream into the first column, scrubbing said vapor stream in said first column with crude liquid carbon disulphide to cool said vapor stream to an extent only sufficient substantially to condense sulphur which collects as a liquid in the bottom of the first column, removing a gas stream from the top of the first column, cooling said stream to condense carbon disulphide and provide (1) an uncondensed gas fraction and (2) crude liquid carbon disulphide, returning a portion of said liquid carbon disulphide to the first column to scrub said vapor stream as aforesaid, and fractionating the balance of the crude liquid carbon disulphide and said gas fraction in said second column to recover substantially pure liquid carbon disulphide.

4. The process of claim 1 wherein a gas is passed through the sulphur collected in the bottom of the first column to volatilize carbon disulphide dissolved in the sulphur.

5. A process for separating and recovering substantially pure carbon disulphide from the vapor stream evolved from a carbon disulphide retort and including hydrogen sulphide and sulphur as impurities in the carbon disulphide vapor, the process comprising introducing said vapor stream as such and without any substantial prior cooling, into a scrubbing zone and scrubbing said vapor stream in said zone with crude liquid carbon disulphide to cool said vapor stream to an extent only sufficient substantially to condense sulphur, collecting the condensed sulphur as such from said zone, removing a vapor stream of volatilized carbon disulphide and reaction products remaining uncondensed from the scrubbing zone, cooling said removed vapor stream to condense carbon disulphide and provide (1) an uncondensed gas fraction and (2) crude liquid carbon disulphide, returning a portion of said liquid carbon disulphide to the first column to scrub said vapor stream as aforesaid, fractionating the balance of the crude liquid carbon disulphide and said gas fraction to separate the carbon disulphide from hydrogen sulphide and other uncondensable gases, and recovering the carbon disulphide from the fractionation operation as a substantially pure product.

6. A process for separating and recovering substantially pure carbon disulphide from the vapor stream evolved from a carbon disulphide retort and including hydrogen sulphide and sulphur as impurities in the carbon disulphide vapor, the process comprising introducing said vapor stream as such and without any substantial prior cooling, into a scrubbing zone and scrubbing said vapor stream in said zone with crude liquid carbon disulphide to cool said vapor stream to an extent only sufficient substantially to condense sulphur, collecting the condensed sulphur as such from said zone, removing a vapor stream of volatilized carbon disulphide and reaction products remaining uncondensed from the scrubbing zone, heating said collected sulphur to drive dissolved carbon disulphide into said vapor stream, cooling said removed vapor stream to condense carbon disulphide and provide (1) a liquid stream of crude carbon disulphide for use in the aforesaid scrubbing of the vapor stream, (2) additional crude liquid carbon disulphide and (3) an uncondensed gas fraction, fractionating the balance of the crude liquid carbon disulphide and said gas fraction to separate the carbon disulphide from hydrogen sulphide and other uncondensable gases, and recovering the carbon disulphide from the fractionation operation as a substantially pure product.

ARNOLD BELCHETZ.